(12) United States Patent
Chen et al.

(10) Patent No.: US 10,517,396 B2
(45) Date of Patent: Dec. 31, 2019

(54) SLIDE RAIL ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Hsiu-Chiang Liang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 16/036,958

(22) Filed: Jul. 17, 2018

(65) Prior Publication Data

US 2019/0261773 A1 Aug. 29, 2019

(30) Foreign Application Priority Data

Feb. 27, 2018 (TW) .............................. 107106907 A

(51) Int. Cl.
| | |
|---|---|
| *A47B 88/407* | (2017.01) |
| *A47B 88/403* | (2017.01) |
| *A47B 88/483* | (2017.01) |
| *A47B 88/427* | (2017.01) |

(52) U.S. Cl.
CPC .......... *A47B 88/407* (2017.01); *A47B 88/403* (2017.01); *A47B 88/427* (2017.01); *A47B 88/483* (2017.01); *F16C 2314/72* (2013.01)

(58) Field of Classification Search
CPC ... A47B 88/407; A47B 88/403; A47B 88/427; A47B 88/483; A47B 2088/4278; A47B 2088/4276; A47B 2210/0081; F16C 2314/72
See application file for complete search history.

(56) References Cited

U.S. PATENT DOCUMENTS

| 3,074,766 A | * | 1/1963 | Meyer | A47B 88/493 |
| | | | | 312/334.44 |
| 5,632,541 A | * | 5/1997 | Uthoff | A47B 88/427 |
| | | | | 312/333 |

(Continued)

FOREIGN PATENT DOCUMENTS

| CN | 105899105 A | 8/2016 |
| EP | 2 250 936 A2 | 11/2010 |

(Continued)

*Primary Examiner* — Hanh V Tran
(74) *Attorney, Agent, or Firm* — Winston Hsu

(57) ABSTRACT

A slide rail assembly is disclosed and includes a first rail, a second rail and a fitting member. The second rail and the first rails are movable relative to each other. The fitting member is detachably mounted to one of the first rail and the second rail. The fitting member is configured to block the second rail as a blocking member, such that the second rail is located at a same position when retracted relative to the first rail. Alternatively, the fitting member is configured to adjust the position of the second rail as an adjusting device, such that the second rail can be located at different positions in response to the adjustment of the adjusting device when retracted relative to the first rail.

18 Claims, 10 Drawing Sheets

(56) References Cited

U.S. PATENT DOCUMENTS

| | | | | |
|---|---|---|---|---|
| 7,758,135 B2* | 7/2010 | Lam | .................... | A47B 88/49 312/334.45 |
| 8,413,298 B2* | 4/2013 | Domenig | .................... | E05F 5/02 16/85 |
| 8,424,984 B2 | 4/2013 | Ritter | | |
| 8,727,460 B2* | 5/2014 | Grabher | .................... | E05F 5/02 312/333 |
| 9,743,766 B2 | 8/2017 | Chen | | |
| 9,974,386 B2* | 5/2018 | Langguth | .................... | A47B 88/956 |
| 10,149,539 B2* | 12/2018 | McGregor | .................... | A47B 88/49 |
| 2005/0235823 A1* | 10/2005 | Zimmer | .................... | F16F 9/0218 92/109 |
| 2006/0220284 A1* | 10/2006 | Holzapfel | .................... | E05F 5/10 267/124 |
| 2008/0265729 A1* | 10/2008 | Netzer | .................... | A47B 95/043 312/330.1 |
| 2011/0094055 A1* | 4/2011 | Domenig | .................... | E05F 5/02 16/83 |
| 2011/0094056 A1* | 4/2011 | Lautenschlager | .................... | E05F 5/02 16/84 |
| 2012/0017414 A1* | 1/2012 | Cerniglia | .................... | A47B 88/43 29/428 |
| 2012/0306337 A1* | 12/2012 | Hammerle | .................... | G01G 19/024 312/334.8 |
| 2013/0077900 A1* | 3/2013 | Lowe | .................... | A47B 88/493 384/18 |
| 2017/0347794 A1* | 12/2017 | McGregor | .................... | A47B 88/49 |
| 2018/0255925 A1* | 9/2018 | Chen | .................... | F16C 29/005 |
| 2018/0255927 A1* | 9/2018 | Chen | .................... | A47B 88/49 |
| 2019/0090633 A1* | 3/2019 | Hsu | .................... | A47B 88/407 |

FOREIGN PATENT DOCUMENTS

| | | | | |
|---|---|---|---|---|
| EP | 2 745 735 A1 | 6/2014 | | |
| JP | S39-2892 | 2/1964 | | |
| JP | 2007105462 A | * | 4/2007 | ............ A47B 88/49 |
| KR | 10-1454917 B1 | 11/2014 | | |
| WO | 2012/084593 A1 | 6/2012 | | |
| WO | 2015/120493 A1 | 8/2015 | | |
| WO | 2016/177732 A1 | 11/2016 | | |
| WO | 2018/011356 A1 | 1/2018 | | |

* cited by examiner

SLIDE RAIL ASSEMBLY

BACKGROUND OF THE INVENTION

1. Field of the Invention

The present invention relates to a slide rail assembly applicable to a furniture system, and more particularly, to a fitting member enabling a slide rail assembly to be mounted depending on user's demands.

2. Description of the Prior Art

In general, a slide rail assembly is implemented in a wide range of applications. For example, a slide rail assembly can be applied to a furniture system or a rack system for electronic apparatus. The slide rail assembly being applied to the furniture system is taken as an example. The slide rail assembly comprises a fixed rail and a sliding rail longitudinally movable relative to the fixed rail. Wherein, the fixed rail is usually fixedly mounted to a cabinet, and the sliding rail is configured to carry a drawer, in order to allow the drawer to be moved relative to the cabinet.

However, there are different demands in the market. For an illustration of this, in a first type of demand, the drawer (the sliding rail) is desired to be located at a same position when the drawer is retracted relative to the cabinet (the fixed rail). Alternatively, in a second type of demand taking tolerance in consideration, it is desired for the drawer (the sliding rail) to have an adjusting mechanism to adjust a depth between the drawer and the cabinet (the fixed rail). Accordingly, the drawer is able to be located at different positions (i.e., different longitudinal positions) when the drawer (the sliding rail) is retracted relative to the cabinet. The abovementioned adjusting mechanism can be with regard to decline tolerance issues between the drawer (the sliding rail) and the cabinet (the fixed rail).

In the related prior arts, U.S. patent with U.S. Pat. No. 8,424,984 B2 discloses a device (7) enabling the drawer to be releasably connected to the slide rail assembly for drawers. Wherein, when the drawer (2) is in a mounted status, the drawer is able to contact a holding portion (13) of the slide rail (5) through an elastic area (12). Wherein, the elastic area (12) is a cushion for a supporting base (11) of the device (7) and the holding portion (13) of the slide rail (5). As such, the length tolerances between the drawer (2) and the slide rail (5) during mounting process might be solved. Herein, the abovementioned related patent is included as a reference.

SUMMARY OF THE INVENTION

The present invention provides a slide rail assembly applicable to a furniture system capable of allowing two slide rails to be located at a same position or different positions when the two slide rails are retracted relative to each other depending on user's demands.

According to an aspect of the present invention, a slide rail assembly includes a first rail, a second rail, a blocking structure and a fitting member. The second rail is longitudinally movable relative to the first rail. The blocking structure is arranged on one of the first rail and the second rail. The fitting member is detachably mounted to the other one of the first rail and the second rail. Wherein, when the fitting member is mounted to the other one of the first rail and the second rail and the second rail is retraced relative to the first rail, through the fitting member abutting against the blocking structure allows the second rail to be located at one single longitudinally predetermined position or multiple longitudinally predetermined positions relative to the first rail.

Preferably, the slide rail assembly further comprises a base, the base is connected to the other one of the first rail and the second rail, and the fitting member is detachably mounted on the base.

Preferably, the fitting member is a blocking member, when the blocking member is mounted on the base and the second rail is retracted relative to the first rail, through the blocking member abutting against the blocking structure allows the second rail to be located at the one single longitudinally predetermined position.

Preferably, the blocking member is made of elastic material.

Preferably, the fitting member is an adjusting device, the adjusting device comprises a mounting member and an adjusting member, the mounting member and the adjusting member are connected to each other in an adjustable manner, the mounting member is able to be mounted on the base, the adjusting member abuts against the blocking structure when the second rail is retracted relative to the first rail.

Preferably, the mounting member and the adjusting member are screwed to each other.

Preferably, the base comprises a connecting portion and a plurality of walls, the walls are connected to the other one of the first rail and the second rail through the connecting portion, and a space is defined by the plurality of walls.

Preferably, a non-circular outline is formed by the plurality of walls and configured to be detachably mounted with the fitting member.

Preferably, each of the first rail and the second rail comprises a front portion and a rear portion, the base is connected to the other one of the first rail and the second rail and located adjacent to the front portion.

According to another aspect of the present invention, a slide rail assembly includes a first rail, a second rail, a blocking structure and an adjusting device. The second rail is longitudinally movable relative to the first rail. The blocking structure is arranged on one of the first rail and the second rail. The adjusting device is mounted on the other one of the first rail and the second rail, the adjusting device comprising a mounting member and an adjusting member, the mounting member and the adjusting member are connected to each other in an adjustable manner, such that a length of the adjusting device is adjustable. Wherein, when the second rail is retracted relative to the first rail, the adjusting device abuts against the blocking structure.

According to another aspect of the present invention, a slide rail assembly is applicable to a furniture system. The furniture system includes a first furniture member and a second furniture member. The first furniture member and the second furniture member are mounting with each other through the slide rail assembly. The slide rail assembly includes a first furniture member, a second furniture member, a first rail, a second rail, a blocking structure and a fitting member. The first rail is fixedly mounted on the first furniture member. The second rail carries the second furniture member. The blocking structure is arranged on one of the first rail and the second rail. The fitting member is detachably mounted to the other one of the first rail and the second rail. Wherein, when the fitting member is mounted to the other one of the first rail and the second rail and the second furniture member is retraced relative to the first furniture member, through the fitting member abutting against the blocking structure allows the second furniture member to be located at one single longitudinally predetermined position or multiple longitudinally predetermined positions relative to the first rail.

Preferably, the fitting member is a blocking member, when the second rail is retracted relative to the first rail, through the blocking member abutting against the blocking structure allows the second rail to be located at the one single longitudinally predetermined position.

Preferably, the fitting member is an adjusting device, the adjusting device comprises a mounting member and an adjusting member, the mounting member and the adjusting member are connected to each other in an adjustable manner, when the second rail is retracted relative to the first rail, the adjusting member abuts against the blocking structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
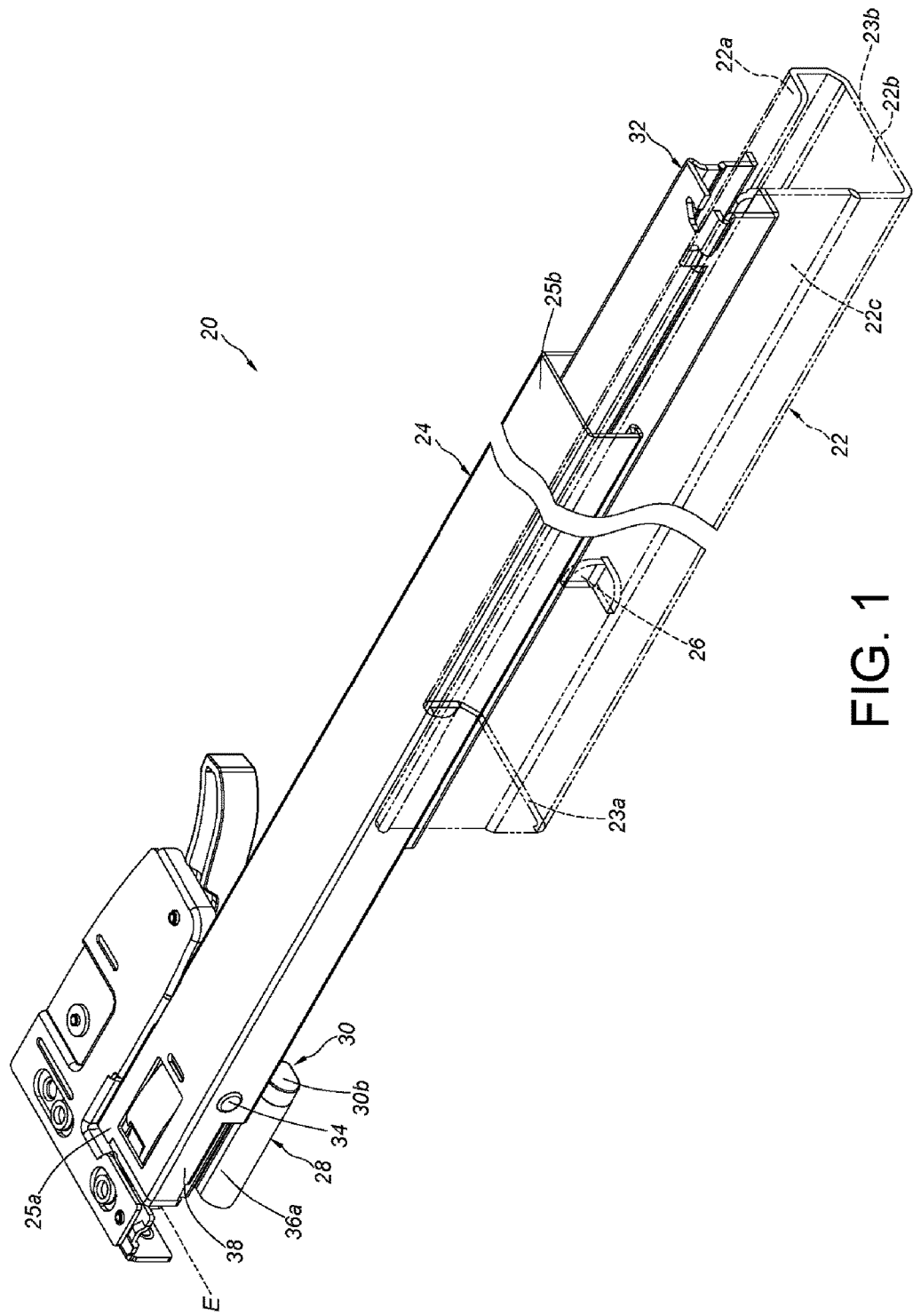
FIG. 1 is a schematic diagram illustrating a slide rail assembly according to a first embodiment of the present invention.
Figure 2:
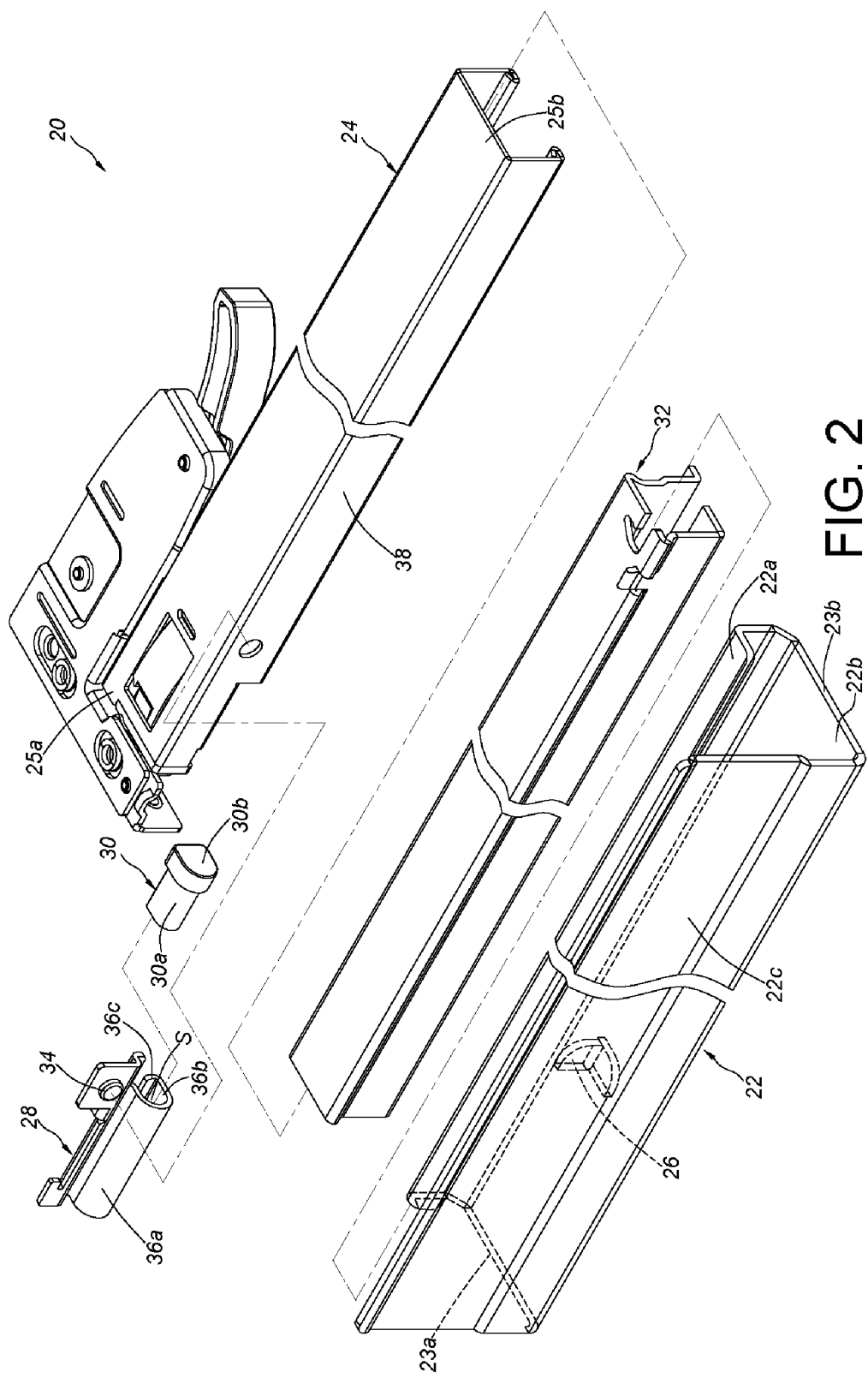
FIG. 2 is an exploded view of the slide rail assembly according to the first embodiment of the present invention.

As shown in FIG. 1 and FIG. 2, a slide rail assembly 20 according to an embodiment of the present invention includes a first rail 22, a second rail 24, a blocking structure 26 and a base 28. In addition, the slide rail assembly 20 further comprises a fitting member. In the present embodiment, the fitting member is illustrated as a blocking member 30.

The first rail 22 has a rail 22a, an extension portion 22b and a perpendicular portion 22c. The extension portion 22b is connected between the rail 22a and the perpendicular portion 22c. Wherein, the blocking structure 26 is arranged on one of the first rail 22 and the second rail 24. Hereinafter, it is illustrative of an example that the blocking structure 26 is arranged on the extension portion 22b of the first rail 22. Wherein, the blocking structure 26 can be a protrusion or a blocking wall. The first rail 22 further has a front portion 23a and a rear portion 23b. Preferably, the blocking structure 26 is arranged adjacent to the front portion 23a of the first rail 22 and located in a space surrounded by the rail 22a, the extension portion 22b and the perpendicular portion 22c.

The second rail 24 is longitudinally movable relative to the first rail 22. Preferably, the slide rail assembly 20 further comprises a third rail 32 movably mounted between the second rail 24 and (the rail 22a of) the first rail 22. The third rail 32 is configured to extend a traveling distance of the second rail 24 relative to the first rail 22. The second rail 24 has a front portion 25a and a rear portion 25b. As shown in FIG. 1, the second rail 24 is located at an extension position E relative to the first rail 22.

The base 28 is connected to the other one of the first rail 22 and the second rail 24. Hereinafter, it is illustrative of an example that the base 28 is connected to the second rail 24. The base 28 can be fixedly connected to the second rail 24. Alternatively, the base 28 can be detachably connected to the second rail 24. When the base 28 is connected to the second rail 24, the base 28 be regarded as a part of the second rail 24. Preferably, the base 28 is connected and adjacent to the front portion 25a of the second rail 24. Preferably, the base 28 is arranged along a longitudinal direction, and the base 28 comprises a connection portion 34 and a plurality of walls. In the present embodiment, the plurality of walls are a first wall 36a, a second wall 36b and a third wall 36c. The connection portion 34 is connected to the first wall 36a. The first wall 36a, the second wall 36b and the third wall 36c are connected to a side portion 38 of the second rail 24 through the connection portion 34. The first wall 36a, the second wall 36b and the third wall 36c are bent relative to one another. A space S is defined by the first wall 36a, the second wall 36b and the third wall 36c, and the space S is configured to be detachably mounted with the blocking member 30. Preferably, a non-circular outline is formed by the first wall 36a, the second wall 36b and the third wall 36c, and the space S is defined by the non-circular outline.

The blocking member 30 is detachably mounted on the base 28. For example, the blocking member 30 comprises a first portion 30a configured to be mounted in the space S. Preferably, the blocking member 30 further comprises a second portion 30b connected to the first portion 30a. A size of the second portion 30b is greater than a size of the first portion 30a and a size of the space S. When the first portion 30a is mounted in the space S, the second portion 30b is located out of the space S of the base 28. Preferably, the blocking member 30 is made of non-metallic material, such as plastic or elastic material.

Figure 3:
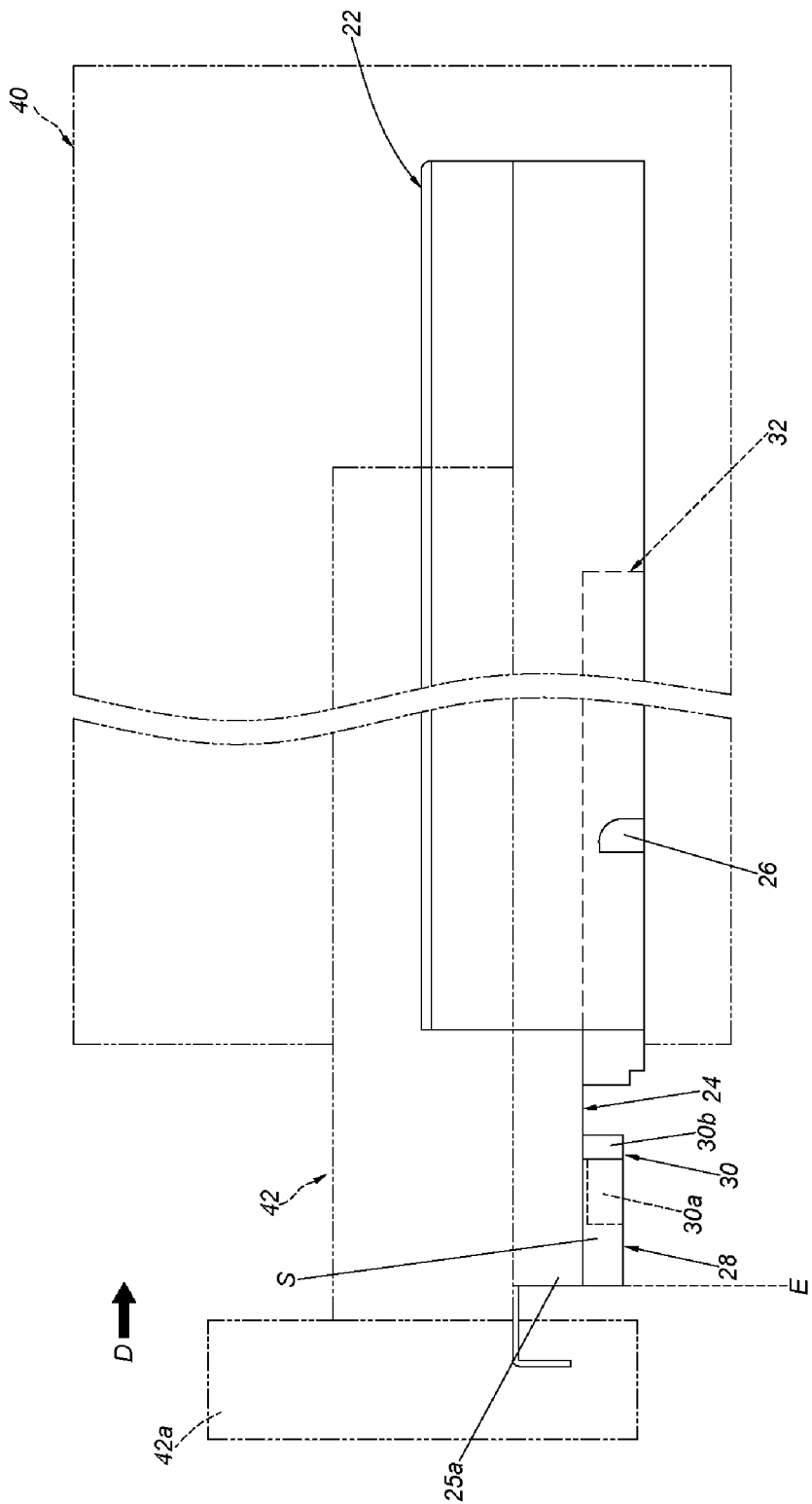
FIG. 3 is a diagram illustrating the slide rail assembly applied to a furniture system and a second rail of the slide rail assembly located at an extension position relative to a first rail of the slide rail assembly according to the first embodiment of the present invention.

As shown in FIG. 3, the slide rail assembly 20 is applicable to a furniture system. The furniture system comprises a first furniture member 40 (such as a cabinet) and a second furniture member 42 (such as a drawer). The second furniture member 42 has a front board 42a. Wherein, the first rail 22 is fixedly mounted to the first furniture member 40 and can be regarded as a part of the first furniture member 40. On the other hand, the second rail 24 is configured to carry a bottom of the second furniture member 42 and can be regarded as a part of the second furniture member 42. When the second rail 24 is located at the extension position E relative to the first rail 22, a distance is between the blocking member 30 and the blocking structure 26.

Figure 4:
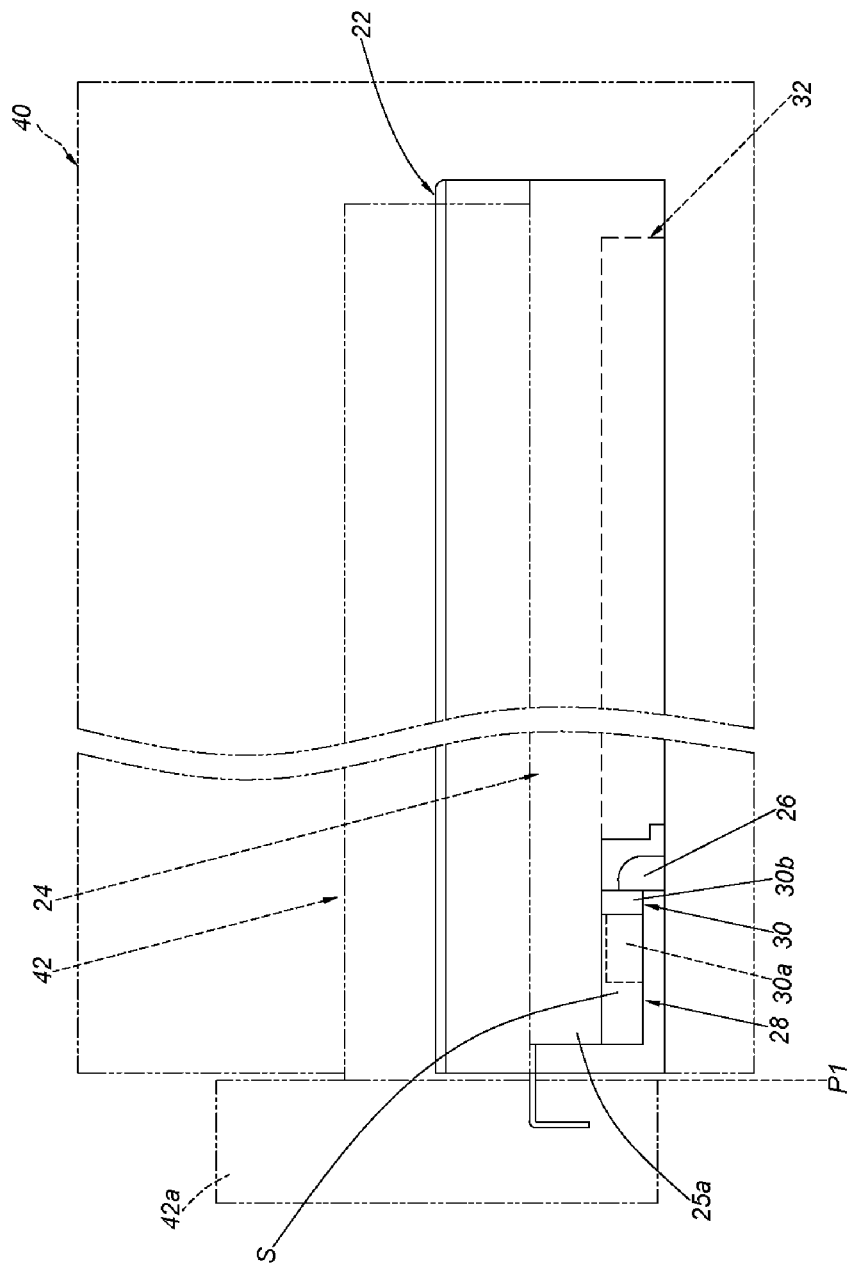
FIG. 4 is a diagram illustrating the second rail of the slide rail assembly is retracted relative to the first rail of the slide rail assembly according to the first embodiment of the present invention.

As shown in FIG. 3 and FIG. 4, in a first type of a user's demand, with the blocking member 30 (also known as fitting member) being mounted on the base 28 enables the second rail 24 to be located at a substantially same position or to reduce noise when the second rail 24 is retracted relative to the first rail 22.

Specifically, when the blocking member 30 is mounted on the base 28 and the second rail 24 is retracted relative to the first rail 22 from the extension position E along a direction D (e.g., when the second rail 24 is completely retracted relative to the first rail 22), through the blocking member 30 (such as the second portion 30b) abutting against the blocking structure 26 allows the second rail 24 to be located at the one single longitudinally predetermined position (i.e., the one single depth position). In the present embodiment, the second rail 24 is located at a first longitudinal position P1. In other words, when the second rail 24 is retracted relative to the first rail 22 from the extension position E along the direction D (e.g., when the second rail 24 is completely retracted relative to the first rail 22), the second rail 24 is able to be substantially located at the first longitudinal position P1 relative to the first rail 22 through the blocking member 30 (such as the second portion 30b) abutting against the blocking structure 26. Since the blocking member 30 is made of plastic or elastic material, the blocking member 30 is able to reduce the noise or to provide a damping effect when the blocking member 30 abuts against the blocking structure 26 (i.e., when the second rail 24 is retracted relative to the first rail 22 and located at the first longitudinal position P1).

Figure 5:
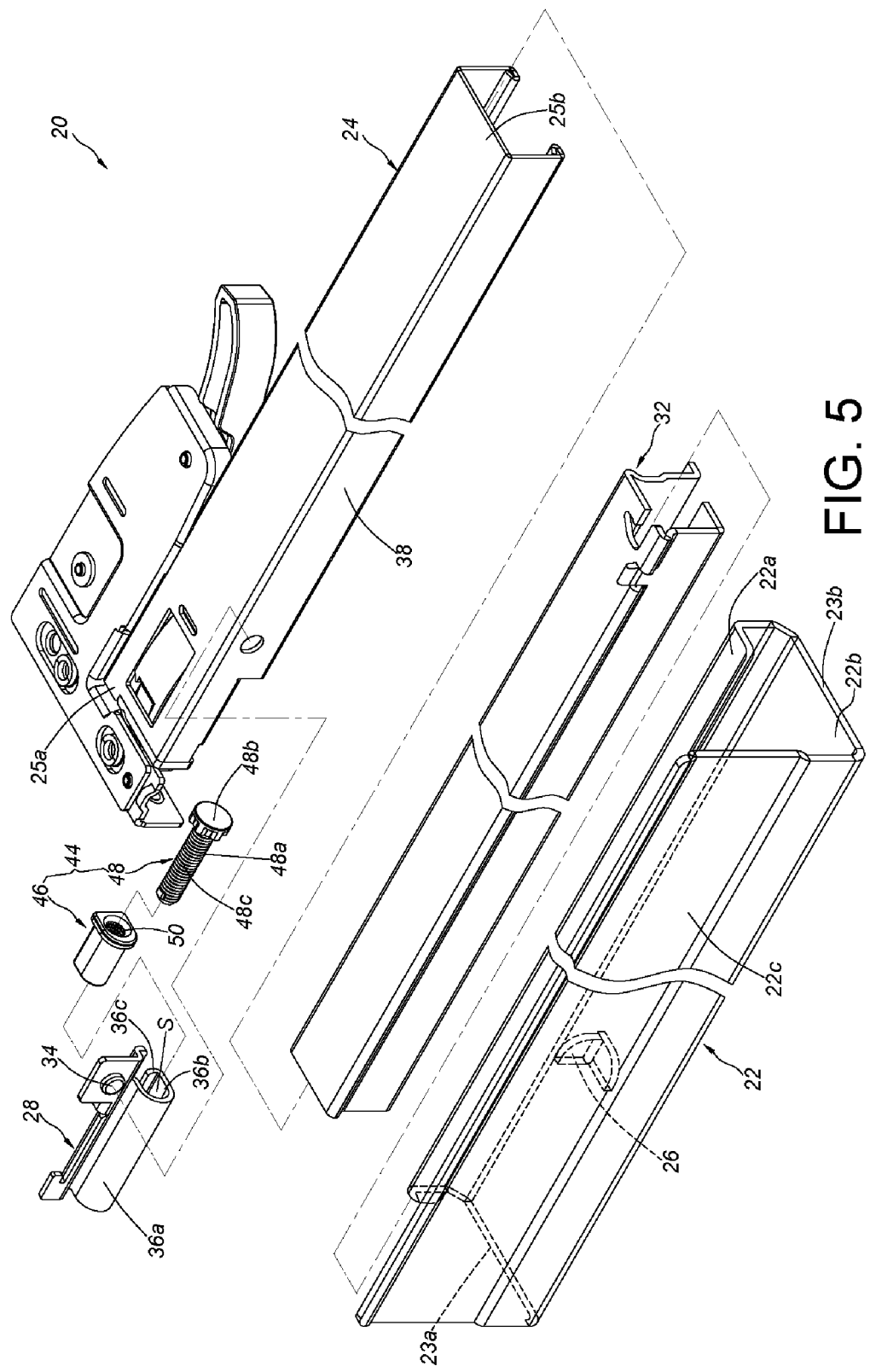
FIG. 5 is an exploded view of a slide rail assembly according to a second embodiment of the present invention.
Figure 6:
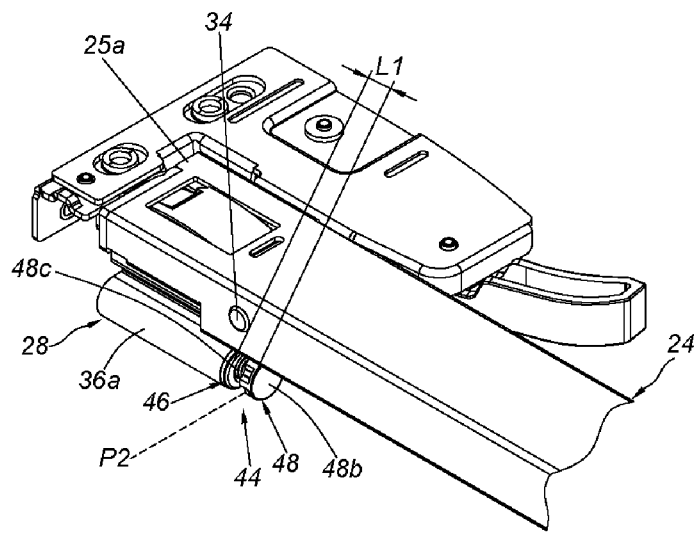
FIG. 6 is diagram illustrating an adjusting device attached on a second rail of the slide rail assembly and the adjusting device being in a first status according to the second embodiment of the present invention.

As shown in FIG. 5 and FIG. 6, in a second type of the user's demand, the furniture system or the slide rail assembly 20 with capability of depth adjustment is desired, or alternatively, an adjusting mechanism for solving tolerance issue between the first rail 22 (or the first furniture member 40) and the second rail 24 (or the second furniture member 42) is desired. The aforementioned fitting member can be an adjusting device 44, which is able to be selectively mounted on the base 28.

Specifically, if the blocking member 30 is already mounted on the base 28, the blocking member 30 can be detached from the base 28 first, and then the adjusting device 44 is mounted on the base 28. In other words, depending on the aforesaid two types of demand, the blocking member 30 and the adjusting device 44 are able to respectively be mounted on the base 28 respectively. The blocking member 30 and the adjusting device 44 are mounted in the same position. Wherein, the adjusting device 44 comprises a mounting member 46 and an adjusting member 48. The mounting member 46 and the adjusting member 48 are adjustably connected to each other. For example, the mounting member 46 and the adjusting member 48 are screwed to each other. Wherein, the mounting member 46 is accommodated and mounted in the space S of the base 28, and the mounting member 46 has a first threaded feature 50. On the other hand, the adjusting member 48 comprises a body portion 48a. Preferably, the adjusting member 48 further comprises a head portion 48b connected to the body portion 48a, and a size of the head portion 48b is greater than a size of the body portion 48a. When the adjusting member 48 is screwed through a second threaded feature 48c to the first threaded feature 50 of the mounting member 46, the head portion 48b is located out of the space S of the base 28. Through the adjusting member 48 connected to the mounting member 46 in an adjustable manner is able to adjust the position of the adjusting member 48 relative to the mounting member 46, such that the length (longitudinal length) of the adjusting device 44 is adjustable. It is noticed that, since the arrangement of other related parts of the slide rail assembly 20 (e.g., the arrangement of the first rail 22, the second rail 24, the blocking structure 26 and the base 28) is illustrated above, related description is omitted herein for simplicity.

As shown in FIG. 6, the base 28 is connected and adjacent to the front portion 25a of the second rail 24. Wherein, when the adjusting member 48 is not yet adjusted relative to the mounting member 46, the adjusting device 44 extends the base 28 by a first length L1. In the meanwhile, the adjusting member 48 is located at a position relative to the mounting member 46, such as a second longitudinal position P2.

Figure 7:
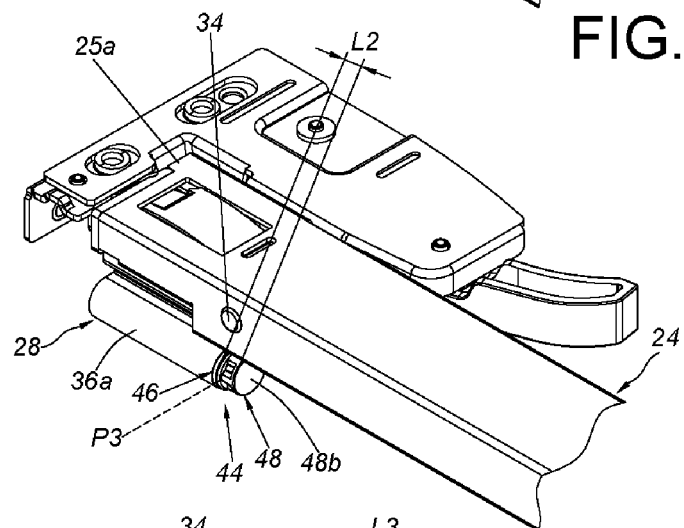
FIG. 7 is diagram illustrating the adjusting device being in a second status according to the second embodiment of the present invention.

As shown in FIG. 7, when the adjusting member 48 is rotated clockwise relative to the mounting member 46, the adjusting device 44 is adjusted to extend the base 28 by a second length L2. In the meanwhile, the adjusting member 48 is located at another position relative to the mounting member 46, such as a third longitudinal position P3.

Figure 8:
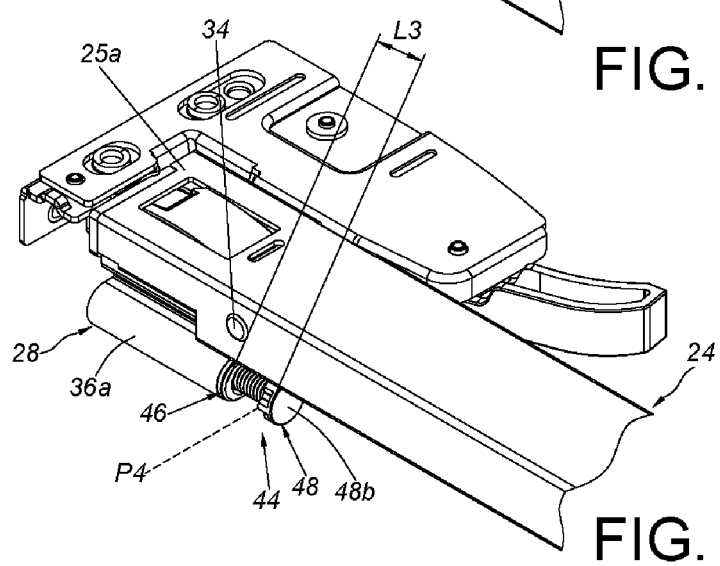
FIG. 8 is diagram illustrating the adjusting device being in a third status according to the second embodiment of the present invention.

As shown in FIG. 8, when the adjusting member 48 is rotated counterclockwise relative to the mounting member 46, the adjusting device 44 is adjusted to extend the base 28 by a third length L3. In the meanwhile, the adjusting member 48 is located at another position relative to the mounting member 46, such as a fourth longitudinal position P4.

The second longitudinal position P2, the third longitudinal position P3 and the fourth longitudinal position P4 are different positions, and the first length L1, second length L2 and the third length L3 are different lengths.

Figure 9:
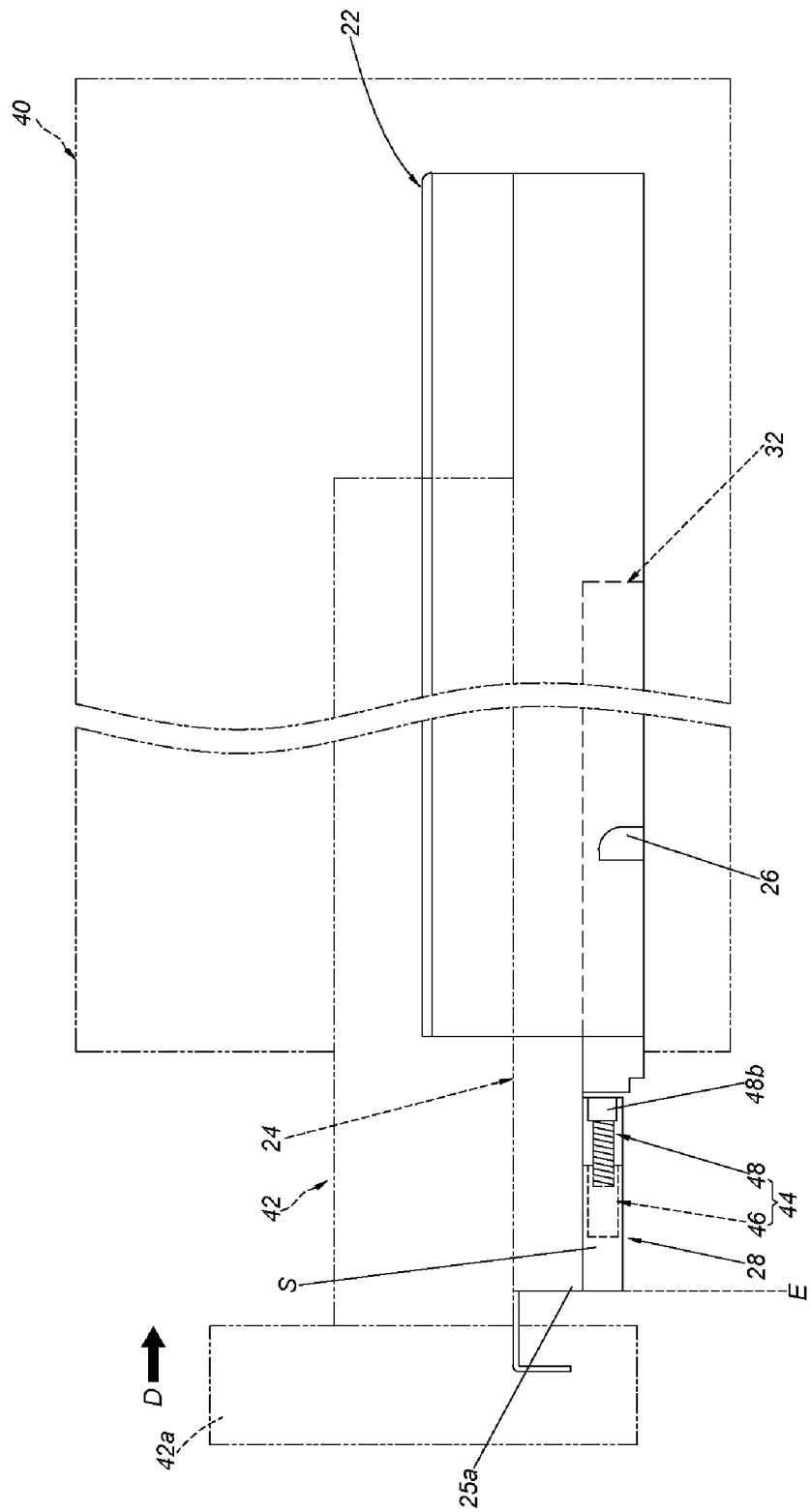
FIG. 9 is diagram illustrating the slide rail assembly applied to a furniture system and the second rail of the slide rail assembly located at an extension position relative to a first rail of the slide rail assembly according to the second embodiment of the present invention.
Figure 10:
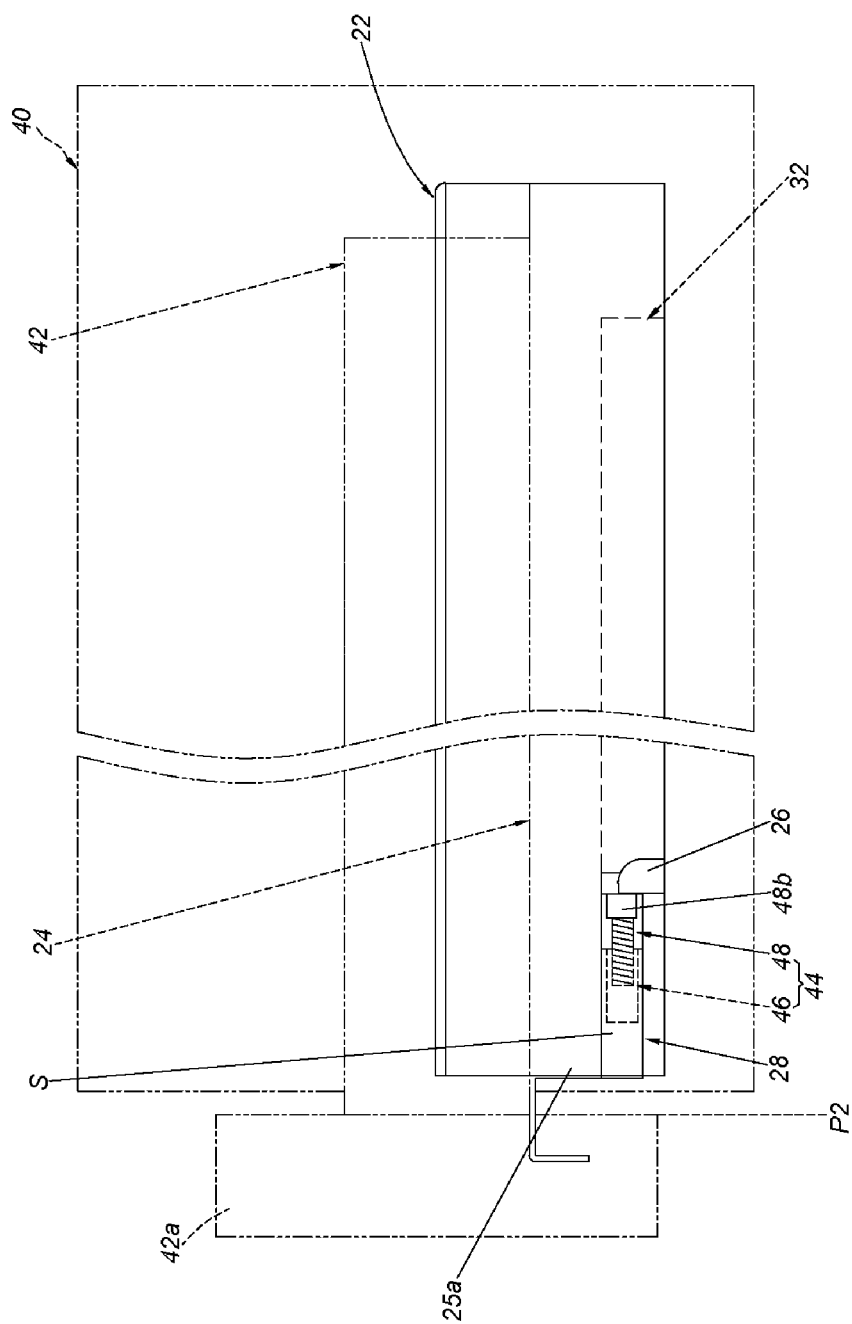
FIG. 10 is a diagram illustrating the second rail of the slide rail assembly is retracted relative to the first rail of the slide rail assembly and the adjusting device being in the first status according to the second embodiment of the present invention.

As shown in FIG. 9 and FIG. 10, when the adjusting device 44 is mounted on the base 28 and the adjusting member 48 is not yet adjusted relative to the mounting member 46 or the base 28 (not shown in figures, e.g., the base 28 is able to have a threaded feature corresponding to the adjusting member 48), the adjusting device 44 has the aforesaid first length L1. In this situation, when the second rail 24 is retracted relative to the first rail 22 from the extension position E along the direction D (e.g., when the second rail 24 is completely retracted relative to the first rail 22), the head portion 48b of the adjusting member 48 abuts against the blocking structure 26 (as shown in FIG. 10), such that the second rail 24 is located at a longitudinal position relative to the first rail 22, such as the aforesaid second longitudinal position P2.

Figure 11:
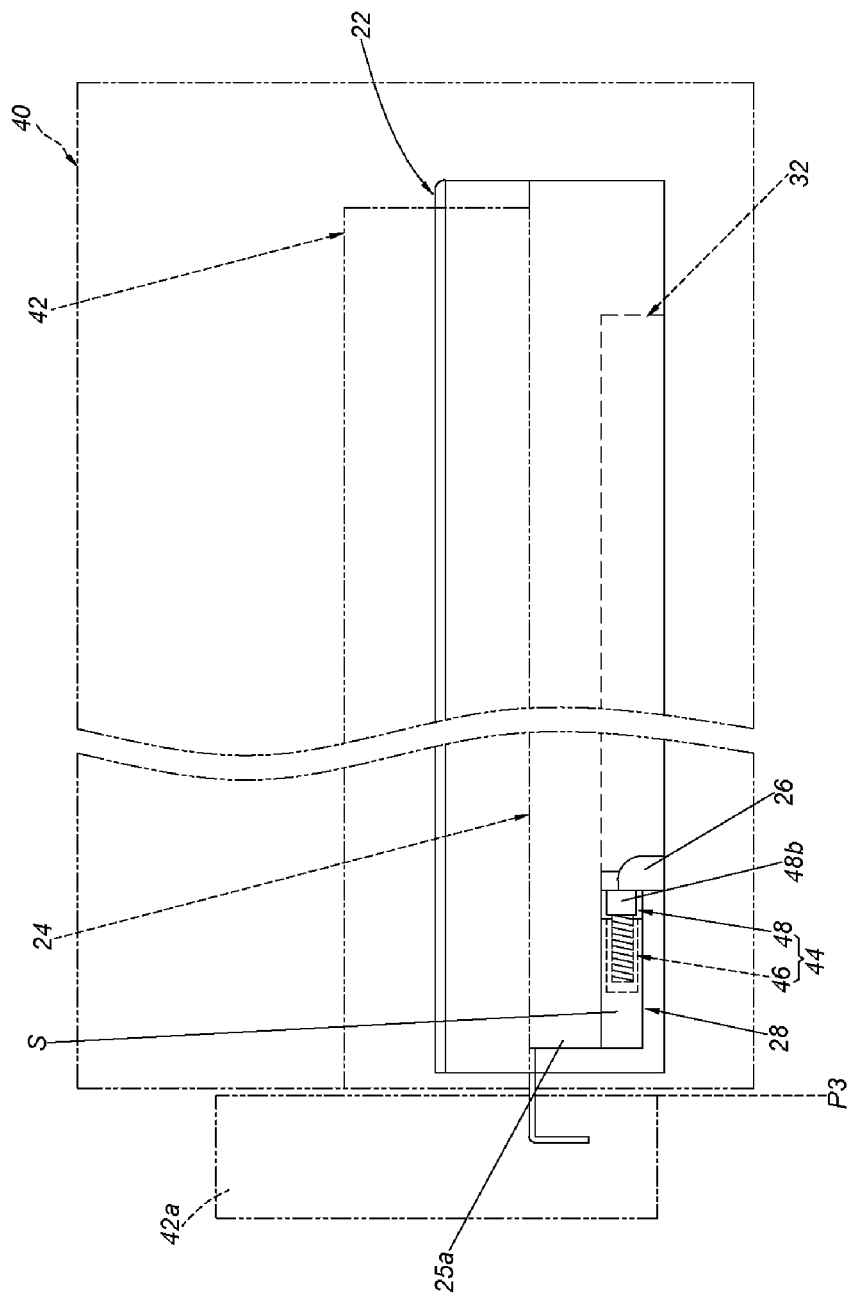
FIG. 11 is a diagram illustrating the second rail of the slide rail assembly is retracted relative to the first rail of the slide rail assembly and the adjusting device being in the second status according to the second embodiment of the present invention.

As shown in FIG. 11, when the adjusting member 48 is adjusted relative to the mounting member 46 or the base 28, the adjusting device 44 has the aforesaid second length L2. In this situation, when the second rail 24 is retracted relative to the first rail 22 from the extension position E along the direction D (e.g., when the second rail 24 is completely retracted relative to the first rail 22), the head portion 48b of the adjusting member 48 abuts against the blocking structure 26, such that the second rail 24 is located at another longitudinal position relative to the first rail 22, such as the aforesaid third longitudinal position P3.

Figure 12:
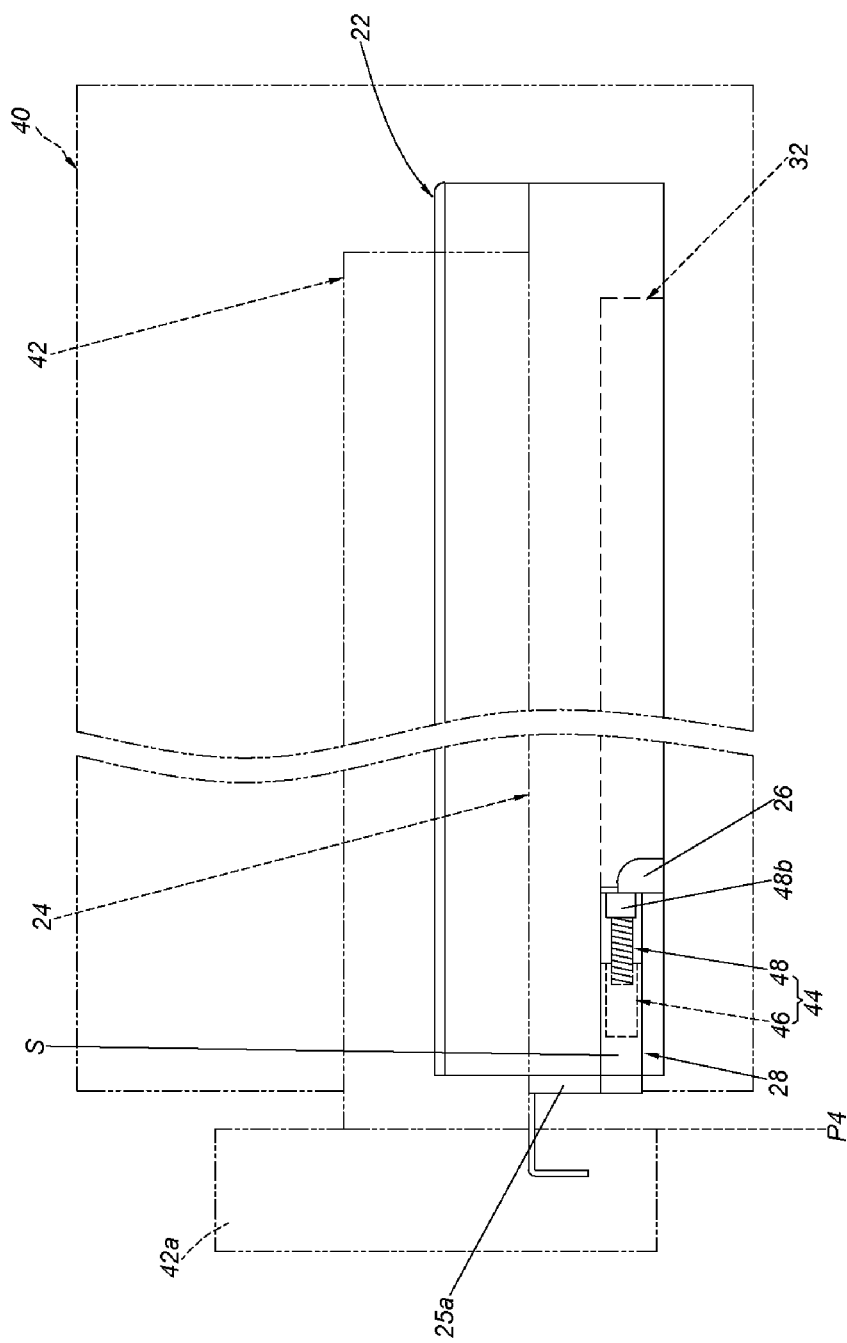
FIG. 12 is a diagram illustrating the second rail of the slide rail assembly is retracted relative to the first rail of the slide rail assembly and the adjusting device being in the third status according to the second embodiment of the present invention.

As shown in FIG. 12, the adjusting member 48 is adjusted relative to the mounting member 46 or the base 28 to have the aforesaid third length L3. In this situation, when the second rail 24 is retracted relative to the first rail 22 from the extension position E along the direction D (e.g., when the second rail 24 is completely retracted relative to the first rail 22), the head portion 48b of the adjusting member 48 abuts against the blocking structure 26, such that the second rail 24 is located at yet another longitudinal position relative to the first rail 22, such as the aforesaid fourth longitudinal position P4.

It can be seen that the length of the adjusting device 44 is adjustable and the adjusting device 44 is able to abut against the blocking structure 26. As such, when the second rail 24 is retracted relative to the first rail 22, the second rail 24 is able to be located at different longitudinal positions (different depth positions), such as the first longitudinal position P1, the second longitudinal position P2, the third longitudinal position P3 and the fourth longitudinal position P4. Wherein, it is noticed that in the second type of demand, when the adjusting member 48 of the adjusting device 44 is not yet adjusted relative to the mounting member 46 to allow the adjusting device 44 to have a length (e.g., the first length L1), and when the second rail 24 is retracted relative to the first rail 22 from the extension position E along the direction D (e.g., when the second rail 24 is completely retracted relative to the first rail 22), the head portion 48b of the adjusting member 48 abuts against the blocking structure 26, such that the second rail 24 is located at the same longitudinal position relative to the first rail 22, such as the second longitudinal position P2. In other words, the adjusting member 48 needs to be adjusted relative to the mounting member 46 for allowing the second rail 24 to be located at another longitudinal position (such as the third longitudinal position P3 or the fourth longitudinal position P4) different from the second longitudinal position P2 when the second rail 24 is retracted relative to the first rail 22.

Accordingly, the embodiments of the present invention include following features:

1. A user is able to mount the blocking member 30 (the fitting member) to a slide rail, in order to allow the slide rail to be located at a substantially same position relative to another slide rail, and further to reduce noise of the impact between the slide rail and the other slide rail. Alternatively, the user can choose to mount the adjusting device 44 (the fitting member) to the slide rail, such that the slide is able to be located at different positions relative to the other slide rail in response to the adjustment of the length of the adjusting device 44. As such, the slide rail assembly is able to meet different demands.

2. The second furniture member 42 (or the second rail 24) of the furniture system is able to be located at different depth positions when being retracted relative to the first furniture member 40 (or the first rail 22) in response to the adjustment of the length of the adjusting device 44 and the adjusting device 44 abutting against the blocking structure 26. Therefore, simplified structure and arrangement of the embodiments of the present invention meet specific operational demand in the market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
    a first rail;
    a second rail longitudinally movable relative to the first rail, wherein the second rail comprising a front portion, a rear portion and a side portion, the side portion being oriented longitudinally and connected to the front portion and the rear portion;
    a blocking structure arranged on the first rail;
    a fitting member detachably mounted to the second rail; and
    a base connected to second rail, wherein the base comprises a connection portion, a first wall, a second wall and a third wall, the connection portion is connected to the first wall;
    wherein the first wall, the second wall and the third wall are connected to the side portion of the second rail through the connection portion;
    wherein the fitting member is detachable mounted on the base;
    wherein when the fitting member is mounted to the second rail and the second rail is retracted relative to the first rail, through the fitting member abutting against the blocking structure allows the second rail to be located at one single longitudinally predetermined position or multiple longitudinally predetermined positions relative to the first rail.

2. The slide rail assembly of claim 1, wherein the fitting member is a blocking member, when the blocking member is mounted on the base and the second rail is retracted relative to the first rail, through the blocking member abutting against the blocking structure allows the second rail to be located at the one single longitudinally predetermined position.

3. The slide rail assembly of claim 2, wherein the blocking member is made of elastic material.

4. The slide rail assembly of claim 1, wherein the fitting member is an adjusting device, the adjusting device comprises a mounting member and an adjusting member, the mounting member and the adjusting member are connected to each other in an adjustable manner, the mounting member is able to be mounted on the base, the adjusting member abuts against the blocking structure when the second rail is retracted relative to the first rail.

5. The slide rail assembly of claim 4, wherein the mounting member and the adjusting member are screwed to each other.

6. The slide rail assembly of claim 1, wherein a space is defined by the first wall, the second wall and the third wall of the base.

7. The slide rail assembly of claim 6, wherein a non-circular outline is formed by the first wall, the second wall and the third wall and configured to be detachably mounted with the fitting member.

8. The slide rail assembly of claim 1, wherein the base is located adjacent to the front portion of the second rail.

9. A slide rail assembly, comprising:
    a first rail;
    a second rail longitudinally movable relative to the first rail, where the second rail comprising a front portion, a rear portion and a side portion, the side portion being oriented longitudinally and connected to the front portion and the rear portion;
    a blocking structure arranged on the first rail;
    an adjusting device mounted on the second rail, the adjusting device comprising a mounting member and an adjusting member, the mounting member and the adjusting member are connected to each other in an adjustable manner, such that a length of the adjusting device is adjustable; and a base connected to the second rail, wherein the base comprises a connection portion, a first wall, a second wall and a third wall, the connection portion is connected to the first wall;

wherein the first wall, the second wall and the third wall are connected to the side portion of the second rail through the connection portion;

wherein the adjusting device is detachably mounted on the base;

wherein when the second rail is retracted relative to the first rail, the adjusting device abuts against the blocking structure.

10. The slide rail assembly of claim 9, wherein when the adjusting member is not yet adjusted relative to the mounting member, the adjusting device has a length, when the second rail is retracted relative to the first rail, the adjusting device abuts against the blocking structure, such that the second rail is located at a longitudinal position relative to the first rail.

11. The slide rail assembly of claim 10, wherein when the adjusting member is adjusted relative to the mounting member, the adjusting device has another length, when the second rail is retracted relative to the first rail, the adjusting device abuts against the blocking structure, such that the second rail is located at another longitudinal position relative to the first rail.

12. The slide rail assembly of claim 9, wherein the mounting member and the adjusting member of the adjusting device are screwed to each other.

13. The slide rail assembly of claim 9, wherein a space is defined by the first wall, the second wall and the third wall of the base and configured to be detachably mounted with the adjusting device.

14. The slide rail assembly of claim 13, wherein a non-circular outline is formed by the first wall, the second wall and the third wall.

15. The slide rail assembly of claim 9, wherein the base is located adjacent to the front portion of the second rail.

16. A slide rail assembly, applicable to a furniture system, the furniture system comprising a first furniture member and a second furniture member, the first furniture member and the second furniture member being mounting with each other through the slide rail assembly, the slide rail assembly comprising:

a first rail fixedly mounted on the first furniture member;

a second rail carrying the second furniture member, wherein the second rail comprising a front portion, a rear portion and a side portion, the side portion being oriented longitudinally and connected to the front potion and the rear portion;

a blocking structure arranged on the first rail;

a fitting member detachably mounted to the second rail; and a base connected to second rail, wherein the base comprises a connection portion, a first wall, a second wall and a third wall, the connection portion is connected to the first wall;

wherein the first wall, the second wall and the third wall are connected to the side portion of the second rail through the connection portion;

wherein the fitting member is detachably mounted on the base;

wherein when the fitting member is mounted to the second rail and the second furniture member is retracted relative to the first furniture member, through the fitting member abutting against the blocking structure allows the second furniture member to be located at one single longitudinally predetermined position or multiple longitudinally predetermined positions relative to the first rail.

17. The slide rail assembly of claim 16, wherein the fitting member is a blocking member, when the second rail is retracted relative to the first rail, through the blocking member abutting against the blocking structure allows the second rail to be located at the one single longitudinally predetermined position.

18. The slide rail assembly of claim 16, wherein the fitting member is an adjusting device, the adjusting device comprises a mounting member and an adjusting member, the mounting member and the adjusting member are connected to each other in an adjustable manner, when the second rail is retracted relative to the first rail, the adjusting member abuts against the blocking structure.

* * * * *